Patented July 1, 1947

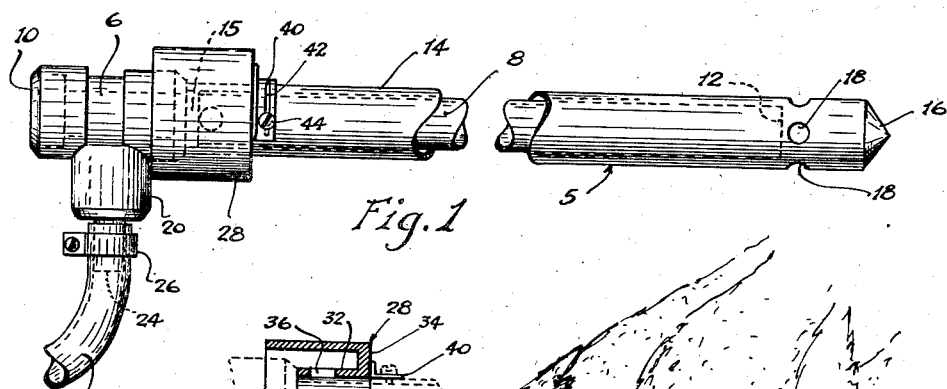
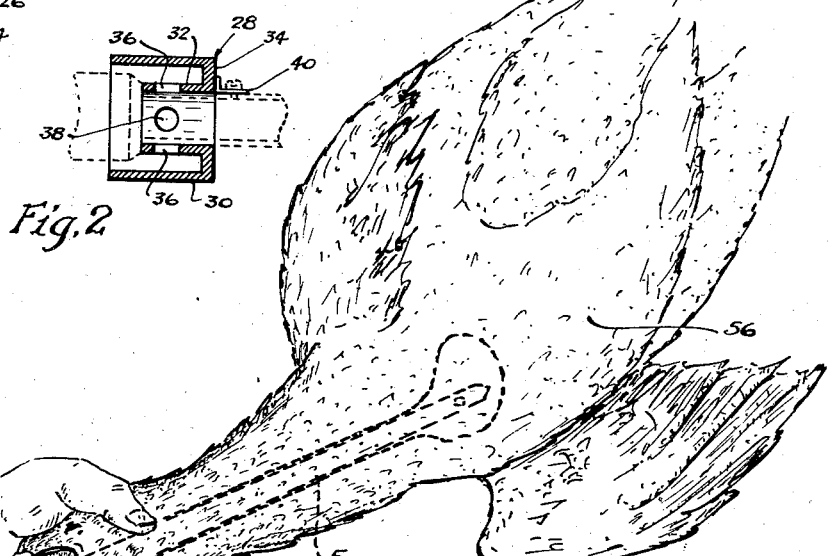
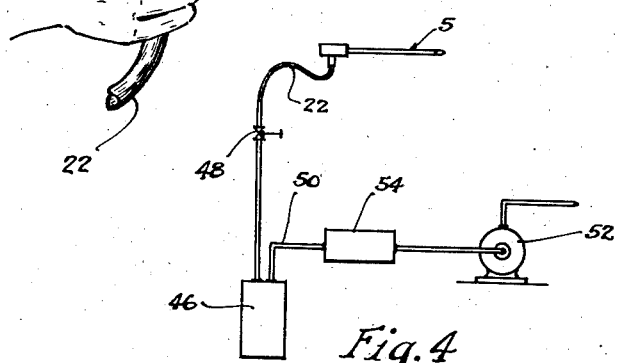

2,423,299

UNITED STATES PATENT OFFICE 2,423,299

PROCESS AND APPARATUS FOR TREATING POULTRY

Elmer M. Davis, St. Paul, Minn., assignor to Industrial Patents Corporation, Chicago, Ill., a corporation of Delaware Application January 21, 1943, Serial No. 473,047

8 Claims. (Cl. 17—11)

1

This invention relates to a process and apparatus for treating poultry. More particularly, it relates to a process and apparatus for removing undesirable deposits from the fore-alimentary tracts of poultry.

The presence of undigested feed in the crops of poultry has created considerable difficulties incidental to marketing the poultry because the weight of this feed tends to increase the weight of the poultry. Furthermore, undigested feed in the crops of slaughtered poultry is subject to rapid putrefaction which gives rise to undesirable odors and detracts from the salability of the poultry. These undesirable factors have given rise to requirements on the part of inspection agencies that the feed be removed from the crops of slaughtered poultry. The only known way of removing such undigested feed, however, was to manually press upon the crop of each bird in an effort to expel the feed through the throat and mouth. This has not been entirely satisfactory because it has been impossible to remove all of the undigested feed in this manner and the throat and mouth of a bird so treated is considerably fouled and creates an unattractive condition. Furthermore, there is a tendency for slaughtered and undressed poultry to bleed at the mouth due to deposits of blood in the throat and mouth and there has been no means of removing these undesirable blood deposits heretofore.

In an effort to overcome at least part of these undesirable conditions, it has been suggested that the crops of slaughtered poultry be removed by making an incision in the body of each bird adjacent the crop and extracting the crop through the incision. In addition to being time consuming, such an operation would decrease the weight of each bird by the weight of the crop and would thereby prohibitively increase the expense. Also, each bird would be left with an open incision which would collect dirt and spoil its appearance.

It is an object of the present invention to provide a process and apparatus for removing undigested feed from the crops of poultry.

It is another object of the present invention to provide a process for conditioning poultry so as to avoid seepage of blood from the mouths of poultry during shipping and handling.

It is a further object of the present invention to provide a process and apparatus for removing deposits from the fore-alimentary tracts of poultry.

2

Other objects and advantages will in part be obvious and will in part appear hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

The process of the invention in general comprises inserting a suction applying tube through the mouth and throat of a slaughtered bird into the crop while applying suction to the tube, scraping the throat of the bird during injection of the tube and to withdraw all materials from the crop, and withdrawing the tube through the throat of the bird while still applying the suction to effectively clean the throat and mouth and thereby remove all blood deposits accumulated in these members.

The apparatus of the present invention in general comprises a suction nozzle capable of being projected through the mouth and throat and into the crop of a bird, and means for applying suction to the nozzle.

For a fuller understanding of the nature and objects of the invention, reference should be made to the following detailed description taken in connection with the accompanying drawings, in which:

Fig. 1 is a side elevational view of a suction applying nozzle for carrying out the process of the present invention, Fig. 2 is a horizontal cross-sectional view of an element of the suction nozzle, Fig. 3 is a view of the suction nozzle while inserted within the crop of a bird so as to remove the undigested feed, and Fig. 4 is a diagrammatic view of the complete apparatus which is used to carry out the process of the present invention.

Referring to Fig. 1, the suction nozzle comprises a substantially T-shaped fitting 6 which has a tube 8 securely fastened in one of the arms thereof in any desired manner, for example, as by soldering. The opposite arm of the T-fitting 6 is closed by a suitable plug 10 which may be screwed or otherwise fastened in place. The tube 8 is open at the end 12 opposite from the end which is fastened to the T-connection 6.

A second tube 14 having a bore of sufficient diameter to receive the tube 8 and leave a small space between the exterior of the tube 8 and the interior of the bore is also suitably connected to the T-connection 6 as by soldering or preferably by being interiorly threaded to receive a threaded sleeve 15 carried by the tube 8. The tube 14 is provided with a closure 16 suitably fastened in the end opposite to that which is connected to the T-connection 6 and the closure 16 is preferably conically shaped as illustrated. The tube 14 is also provided with openings 18, of which there may be four or more, disposed around the periphery of tube 14 adjacent the open end of tube 8.

The leg 20 of the T-connection 6 is suitably connected to a flexible air hose 22 by any suitable means, for example, by means of a nipple 24 suitably connected within the leg 20 and a clamping band 26 which surrounds the hose 22 when the nipple 24 is inserted within the end of the hose so as to clamp the hose between the nipple and clamping ring.

A valve 28 is disposed on the tube 14 adjacent the T-connection 6. The valve 28 comprises a sleeve 30 connected to an inner sleeve 32 by a web 34. The sleeve 32 is provided with a plurality of openings 36 which cooperate with a similar number of openings 38 in the tube 14. When the sleeve 30 is rotated so that the openings 36 and 38 are in registry, the valve is in open position and when the sleeve 30 is rotated so as to move the openings 36 out of registry with the openings 38 the valve is closed. The valve 28 is fastened on the tube 14 for rotation thereabout but prevented from movement therealong by an arcuate flange 40 suitably carried by the web 34 and provided with an arcuate slot 42 which receives a screw 44 partially threaded into the tube 14. This arrangement permits the valve 28 to be rotated to either open or closed position and to substantially any position therebetween so as to produce a throttling action on the air drawn into the tube through the openings 36—38 to thereby vary the suction pressure at the openings 18.

Referring to Fig. 4, the nozzle 5 is shown with the flexible hose 22 connected to a suitable collecting tank 46. A valve 48 placed in the flexible hose 22 permits the suction to be turned on and off as desired. The collecting tank 46 is provided with suitable clean-out openings (not shown) and is connected through a suitable air line 50 to a vacuum pump 52 of any desired design. A filter 54 is suitably connected in the air line 50 to prevent any solid matter from inadvertently passing from the collecting tank to the vacuum pump 52.

In carrying out the process of the present invention, the bird to be treated, illustrated at 56 in Fig. 3, is supported on any suitable rack or table and is grasped by the head with one hand by the operator and the mouth opened and the nozzle 5 passed through the mouth and down the throat and into the crop of the bird. The amount of air which is permitted to pass into the tubing 14 through the valve 28 is determined by trial so as to exert the maximum suction possible without tearing the lining of the throat or of the crop. The air is turned on by the valve 48 just before the nozzle 5 is passed into the mouth of the bird so that blood deposits are removed from the mouth and throat and the throat is scraped clean of all deposits as the tubing 14 passes down the throat of the bird. This scraping action is accomplished by the end of the tube as it opens up the throat passage, and also the scraping action is continued by the frictional engagement which exists between the wall of the tube and the walls of the mouth and throat of the bird. As soon as the end 16 of the nozzle reaches the crop the undigested feed therein will be sucked out and carried through the tubing 8 and the flexible hose 22 to the collecting tank 46. The suction pressure is permitted to remain on while the nozzle is being withdrawn from the crop and throat so as to remove any deposits which are scraped loose during the entry of the nozzle into the mouth and throat.

The process and apparatus of the present invention make it possible to rapidly and completely remove all matter from the crops of slaughtered poultry and to remove all blood deposits from the throats and heads of the poultry, thereby placing the slaughtered poultry in condition to create an attractive appearance for marketing and to be free from the excess weight caused by feed in the crop.

The apparatus is simple in nature so that it does not readily get out of order, and the nozzle can be rapidly cleaned by removing the plug 10 and the tube 14 and/or by passing water or a soapy cleaning solution through the openings 18 while the suction is turned on. The apparatus does not require the services of a highly skilled operator but can be readily used by unskilled operators so that the use of the present invention does not add to the cost of merchandising poultry.

Since certain changes may be made in the above construction and different embodiments of the invention could be made without departing from the scope thereof, it is intended that all matter contained in the above description or shown in the accompanying drawing shall be interpreted as illustrative and not in a limiting sense.

The invention having been described, what is claimed is:

1. The process of treating poultry comprising simultaneously opening the mouth and throat tract of the poultry by inserting a tube into the tract, scraping the interior of the throat of the poultry by deflecting the walls of the tract around the end of the tube during insertion, and applying suction thereto.

2. The process of treating poultry comprising scraping the interior of the throat of a slaughtered bird while applying suction thereto and thereafter applying suction to the interior of the crop to draw the contents therefrom.

3. The process of treating poultry comprising progressively scraping the walls of the mouth and throat of a bird by passing a suction nozzle through the mouth and throat of a bird to scrape out and remove all deposits therefrom, applying the suction to the walls of the mouth and throat substantially at the zone where the scraping is performed, and thereafter passing the end of the nozzle into the crop and withdrawing the contents therefrom.

4. The process of treating poultry comprising inserting a suction applying nozzle through the mouth and throat of a slaughtered bird to scrape and remove deposits therefrom and then passing the nozzle into the crop to remove the contents therefrom and thereafter withdrawing the nozzle so as to remove any deposits scraped loose from the throat and mouth by the entry of the nozzle therein.

5. An apparatus for treating poultry which comprises a suction nozzle having an extended tube thereon for insertion through the mouth and throat of a bird into the crop thereof, said tube having a diameter approximately equal to that of the fore-alimentary tract of the poultry being treated and having a relatively sharply defined shoulder at its forward end over which the walls of the tract are deflected as the tube is inserted into the tract, and the tube having openings near its extremity, said tube being configured to scrape the walls of the mouth and throat as it moves relative thereto, and means for applying suction to the nozzle so as to withdraw material from the crop through said openings.

6. An apparatus for treating poultry which comprises a suction nozzle provided with an extended tube having openings near the outer end thereof and capable of being inserted through the mouth and throat of a poultry product, said tube having a diameter approximately equal to that of the fore-alimentary tract of the poultry product being treated and having a relatively sharply defined shoulder at its forward end over which the walls of the tract are deflected as the tube is inserted through the mouth and throat of the poultry product, said tube being configured to scrape the walls of the mouth and throat as it moves relative thereto, said openings in the tube near the outer end being positioned with respect to the configuration and shoulder of the tube to present suction against the walls substantially simultaneously with the scraping thereof, and means for applying suction to the nozzle.

7. An apparatus for treating poultry which comprises a suction nozzle provided with an extended tube having openings near the outer end thereof and capable of being inserted through the mouth and throat of a poultry product, said tube having a diameter approximately equal to that of the fore-alimentary tract of the poultry product being treated and having a relatively sharply defined shoulder at its forward end over which the walls of the tract are deflected as the tube is inserted through the mouth and throat of the poultry product, said tube being configured to scrape the walls of the mouth and throat as it moves relative thereto, said openings in the tube near the outer end being positioned with respect to the configuration of the tube to present suction against the walls substantially simultaneously with the scraping thereof, and means for producing and controlling the application of suction at the nozzle.

8. The process of treating poultry comprising opening the mouth and throat of the poultry by inserting a tube into the fore-alimentary tract of said poultry, causing the walls of the tract to deflect sharply around the end of said tube to scrape deposits loose from the walls, and applying suction to the tube to effect a removal of deposits scraped free from the walls of said tract.

ELMER M. DAVIS.

REFERENCES CITED

The following references are of record in the file of this patent:

UNITED STATES PATENTS

| Number | Name | Date |
|---|---|---|
| 2,192,838 | McGrew | Mar. 5, 1940 |
| 1,134,530 | Hauber | Apr. 6, 1915 |
| 2,193,999 | Allen | Mar. 19, 1940 |
| 2,310,881 | Swanson | Feb. 9, 1941 |
| 1,011,131 | Marley et al. | Dec. 5, 1911 |
| 1,416,013 | Gieseler | May 16, 1922 |
| 1,689,670 | Gray | Oct. 30, 1928 |
| 1,984,562 | Ashby | Dec. 18, 1934 |
| 2,237,203 | Swanson | Apr. 1, 1941 |
| 2,176,139 | Lofgren | Oct. 17, 1939 |
| 92,769 | Youngblood | July 20, 1869 |
| 1,843,169 | McKesson | Feb. 2, 1932 |